US006991254B2

(12) United States Patent
Yanagibashi et al.

(10) Patent No.: US 6,991,254 B2
(45) Date of Patent: Jan. 31, 2006

(54) AIRBAG SYSTEM

(75) Inventors: Yoshitaka Yanagibashi, Saitama (JP); Hideo Namiki, Saitama (JP); Akiko Tanaka, Saitama (JP); Hideki Akiyama, Saitama (JP); Takeshi Kuroe, Saitama (JP); Takenori Yamamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/252,787

(22) Filed: Sep. 25, 2002

(65) Prior Publication Data
US 2003/0132616 A1 Jul. 17, 2003

(30) Foreign Application Priority Data

| Oct. 2, 2001 | (JP) | ............................. 2001-306260 |
| Oct. 2, 2001 | (JP) | ............................. 2001-306261 |

(51) Int. Cl.
*B60R 21/16* (2006.01)
*B62J 27/00* (2006.01)
(52) U.S. Cl. .................................. 280/730.1; 280/736
(58) Field of Classification Search ............ 280/730.1, 280/730.2, 733, 736, 742
See application file for complete search history.

(56) References Cited

U.S. PATENT DOCUMENTS

| 5,069,478 | A | * | 12/1991 | Kim ............................ 280/733 |
| 5,524,924 | A | * | 6/1996 | Steffens et al. ........... 280/730.2 |
| 5,779,263 | A | * | 7/1998 | Lane et al. ............... 280/730.2 |
| 5,938,231 | A | * | 8/1999 | Yamazaki ................ 280/730.1 |
| 6,007,090 | A | * | 12/1999 | Hosono et al. ........... 280/730.2 |
| 6,158,766 | A | * | 12/2000 | Kowalski .................. 280/730.1 |
| 6,299,200 | B1 | * | 10/2001 | Bowers et al. ............ 280/730.2 |
| 6,425,602 | B1 | * | 7/2002 | Al-Amin et al. .......... 280/730.2 |
| 6,439,604 | B1 | * | 8/2002 | Al-Amin et al. ............ 280/736 |
| 6,588,793 | B2 | * | 7/2003 | Rose ......................... 280/728.2 |
| 2001/0040364 | A1 | * | 11/2001 | Viano et al. .............. 280/730.1 |
| 2002/0067029 | A1 | * | 6/2002 | Guthke et al. ............ 280/730.2 |

FOREIGN PATENT DOCUMENTS

| GB | 2130150 A | * | 5/1984 |
| JP | 8-301031 A | | 11/1996 |
| JP | 11278342 A | * | 10/1999 |

* cited by examiner

*Primary Examiner*—Paul N. Dickson
*Assistant Examiner*—Laura B. Rosenberg
(74) *Attorney, Agent, or Firm*—Birch, Stewart, Kolasch & Birch, LLP

(57) ABSTRACT

An inflator unit provided on a main frame of a motorcycle is provided with an inflator case having an inflator stored therein. Gas generated by the inflator flows through the interior of the main frame and is supplied to the airbag. The inflator case includes the left and right case halves divided along the parting plane and joined with each other by two bolts and the internal space thereof narrows towards an exit opening in the funnel shape. The axis Li of the inflator is shifted to the side opposite from the exit opening with respect to the axis Lc of the inflator case. A main frame may be formed with an atmosphere communication hole for communicating the interior of the main frame with the atmosphere at the position near the inflator case so that the atmosphere is introduced through the atmosphere communication port into the interior of the main frame by the negative pressure generated when gas flows from the inflator to the airbag. Thus, a large-volume airbag can be deployed by a small-capacity inflator.

21 Claims, 6 Drawing Sheets

AIRBAG SYSTEM

CROSS-REFERENCE TO RELATED APPLICATIONS

This nonprovisional application claims priority under 35 U.S.C. § 119(a) on Patent Application Nos. 2001-306260 and 2001-306261 filed in JAPAN on Oct. 2, 2001 and Oct. 2, 2001, respectively, which is herein incorporated by reference.

The present application claims priority under 35 USC 119 to Japanese Patent Application No. 2001-306261 and 2001-306260 both filed on Oct. 2, 2001 the entire contents thereof is hereby incorporated by reference.

BACKGROUND OF THE INVENTION

1. Field of the Invention

The present invention relates to an airbag system including an airbag unit for storing a folded airbag and an inflator unit for storing an inflator for generating gas for inflating the airbag. The airbag unit and the inflator unit are connected via a gas supply member and the airbag unit and the inflator are disposed separately.

2. Description of Background Art

Generally, an airbag module of an airbag system for a vehicle includes a folded airbag and an inflator for generating gas stored therein, so that gas generated by the inflator is directly supplied into the airbag. In contrast thereto, in the case where the airbag module is required to be downsized due to a limitation of the mounting space, there is proposed an airbag system wherein only an airbag is stored in the airbag module and an inflator that is disposed at the position away from the airbag module is connected to the airbag module via a gas supply hose (See JP-A-8-301031).

When the inflator is disposed outside the airbag module, the case for the airbag module cannot be used as a case for the inflator. Therefore, it is necessary to provide an inflator case for storing the inflator separately. In such a case, the inflator case is preferably simple in construction while sufficiently carrying out a function to store the inflator and to provide a hermetic seal.

SUMMARY AND OBJECTS OF THE INVENTION

With such circumstances in view, it is an object of the present invention to simplify the structure of the inflator case of the inflator unit arranged separately from the airbag unit.

In order to achieve the object described above, according to the present invention, there is provided an airbag system comprising an airbag unit for storing a folded airbag and an inflator unit for storing an inflator for generating gas for inflating the airbag. The airbag unit and the inflator unit are connected via a gas supply member with each other wherein an inflator case for storing and protecting the inflator hermetically is divided into a pair of two case halves along a flat parting plane.

According to the construction described above, since the inflator case for storing the inflator is disposed separately from the airbag unit for storing the folded airbag and is divided into a pair of case halves along a flat parting plane, the inflator is reliably stored in the inflator case which is simple in construction and can be easily manufactured. In addition, since the inflator case can be sealed easily and the inflator can be protected from a force, water, dust and the like only by sealing the flat plane, it is especially effective for mounting on a motorcycle or the like.

The present invention provides an airbag system wherein a plurality of supporting portions project from the inflator and are held and supported between a pair of case halves of the inflator case along the parting plane thereof.

According to the construction described above, since the plurality of supporting portions projecting from the inflator body is held and supported between the pair of case halves of the inflator case along the parting plane, the inflator can be attached or detached only by separating the pair of case halves, and thus a special fixing member for fixing the inflator is not necessary, thereby contributing to a reduction in the number of components and the number of assembling steps.

The present invention provides an airbag system wherein a harness extending from the inflator is drawn out of the inflator case through the interior of any one of plurality of supporting portions.

According to the construction described above, since the harness extending from the inflator is drawn out of the inflator case through the interior of the supporting portion, it is not necessary to provide a specific hole for passing the harness thorough the inflator case. More specifically the sealing of the inflator case is facilitated.

The present provides an airbag system wherein the inflator case is provided with a gas supply member connecting unit for connecting a gas supply member for supplying gas to the airbag unit.

According to the construction described above, since the gas supply member connecting unit continuing to the gas supply member is provided on the inflator case, gas generated by the inflator in the sealed inflator case can reliably be supplied to the gas supply member via the gas supply member connecting unit.

The present invention provides an airbag system wherein the interior of the inflator case is tapered towards the gas supply member connecting unit.

According to the construction described above, since the interior of the inflator case is tapered towards the gas supply member connecting unit, gas generated by the inflator can be introduced smoothly into the gas supply member without providing a specific straightening member such as a diffuser.

In another embodiment, when the inflator is disposed outside the airbag module, a gas supply hose for connecting the inflator to the airbag module is required. Thus, the number of components increases correspondingly. In addition, there are problems in that a space for arranging the gas supply hose is required and the appearance is deteriorated because the gas supply hose is exposed.

With such circumstances in view, it is an object of the present invention to enable gas to be supplied from the inflator to the airbag unit without using a gas supply hose when the inflator is disposed outside the airbag unit.

In order to achieve the object described above, according to the present invention, there is provided an airbag system comprising an airbag unit for storing a folded airbag and an inflator for generating gas for inflating the airbag. The airbag unit and the inflator are disposed separately with the interior of pipe members constituting a part of the vehicle body frame being used as a gas passage for introducing gas generated by the inflator into the airbag unit.

According to the construction described above, since the interior of the pipe member constituting a part of the vehicle body frame is used as a gas passage for introducing gas generated by the inflator into the airbag unit, a specific hose for connecting the inflator and the airbag unit is not necessary. Whereby the number of components is reduced for reducing the space required and for improving the appearance.

The present invention provides an airbag system wherein the inflator is stored in the pipe member.

According to the construction described above, since the inflator is stored in the pipe member that constitutes a part of the vehicle body frame, the space for installing the inflator may be saved and the appearance may be improved.

The present invention provides an airbag system wherein a one-way valve for allowing gas to flow only in the direction from the inflator towards the airbag unit is provided in the pipe member.

According to the construction described above, since the one-way valve is provided in the pipe member, gas supplied from the inflator through the interior of the pipe member to the airbag unit is prevented from flowing back to the inflator side due to a load exerted to the deployed airbag. Thus, sufficient shock absorbing effects can be exercised with a small-capacity inflator.

The present invention provides an airbag system wherein the inflator is disposed in the inflator storage section eccentrically and an exit opening for allowing gas to exit from the inflator storage section towards the pipe member is provided on the side far from the inflator.

According to the construction described above, since the inflator is disposed eccentrically in the inflator storage section, and the exit opening for allowing gas to exit from the inflator storage section towards the pipe member is disposed at a position far from the inflator, gas generated by the inflator can be supplied smoothly from the exit opening to the pipe member.

The present invention provides an airbag system wherein an atmosphere communication hole is in communication with the atmosphere and is provided on the pipe member.

According to the construction described above, since the atmosphere communication hole is in communication with the atmosphere and is provided on the pipe member, the atmosphere may be introduced into the pipe member through the atmosphere communication port by the negative pressure generated when gas flows from the inflator to the airbag unit, whereby a large-volume airbag can be deployed with a small-capacity inflator.

The present invention provides an airbag system wherein a gas guiding plate for limiting the direction of flow of gas into the airbag case is provided at the connecting portion between the airbag case of the airbag unit and the pipe member.

According to the construction described above, since the gas guiding plate is provided at the connecting portion between the airbag case of the airbag unit and the pipe member, the airbag can be deployed in the desired direction irrespective of the mounting direction of the airbag case by deflecting the direction of gas flowing into the airbag case by means of the gas guiding plate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to an examples shown in attached drawings, an embodiment of the present invention will be described.

Figure 1:
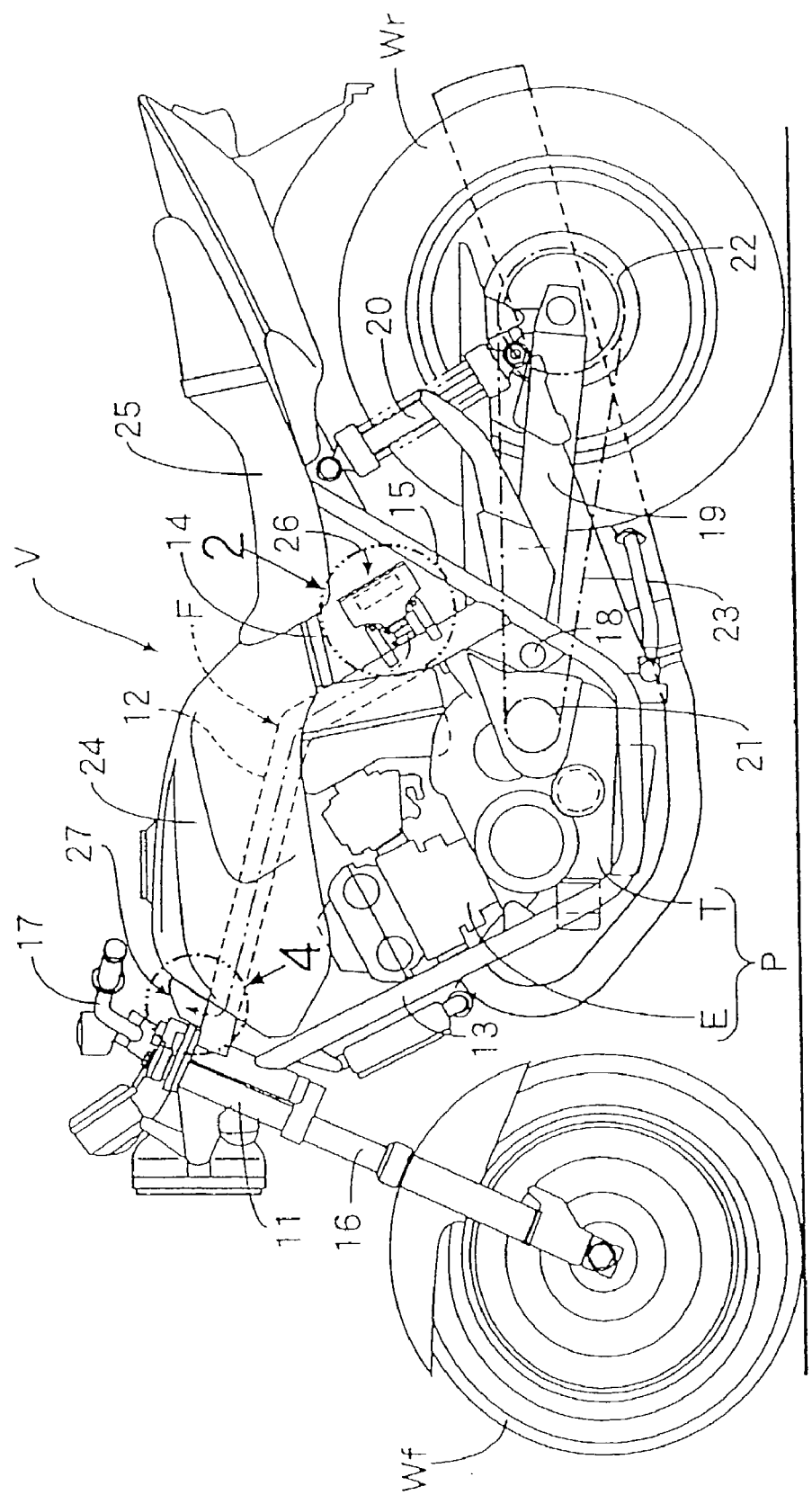
FIG. 1 is a side view showing the entire motorcycle having an airbag system mounted thereon.

As shown in FIG. 1, a vehicle body frame F of a motorcycle V comprises a head pipe 11, a main frame 12 extending from the head pipe 11 downwardly towards the rear and being bent at the midsection further downwardly. A down tube 13 extends from the head pipe 11 downwardly towards the rear and is bent at the midsection towards the rear. A seat rail 14 extends from the mid-section of the main frame 12 towards the rear with a lower pipe 15 extending from the rear end of the down tube 13 upwardly towards the rear and connected to the midsection of the seat rail 14. A power unit P includes an engine E and a transmission T integrally formed with each other. The power unit P is mounted in the space surrounded by the main frame 12, the down tube 13 and the lower pipe 15.

A front wheel Wf is rotatably supported at the lower end of the front fork 16 supported by the head pipe 11. A steering handle 17 is provided on the upper end thereof. The front end of the rear fork 19 is rotatably supported at the rear end of the main frame 12 via a pivot 18. The portion in the vicinity of the rear end of the rear fork 19 on which a rear wheel Wr is rotatably supported is connected to the lower pipe 15 via the shocker absorber 20. A driving sprocket 21 is provided on an output shaft of the transmission T and a driven sprocket 22 is provided on an axle of the rear wheel Wr. The driving sprocket 21 and the driven sprocket 22 are connected by an endless chain 23 with a driving force from the engine E being transmitted to the rear wheel Wr. A fuel tank 24 is provided upwardly of the power unit P so as to lie across the main frame 12. A seat 25 is supported by the seat rail 14 and is disposed rearwardly of the fuel tank 24.

The airbag system comprises an inflator unit 26 disposed in the space surrounded by the main frame 12, the seat rail 14, and the lower pipe 15 and an airbag unit 27 disposed in the space surrounded by the head pipe 11 and the fuel tank 24.

Figure 2:
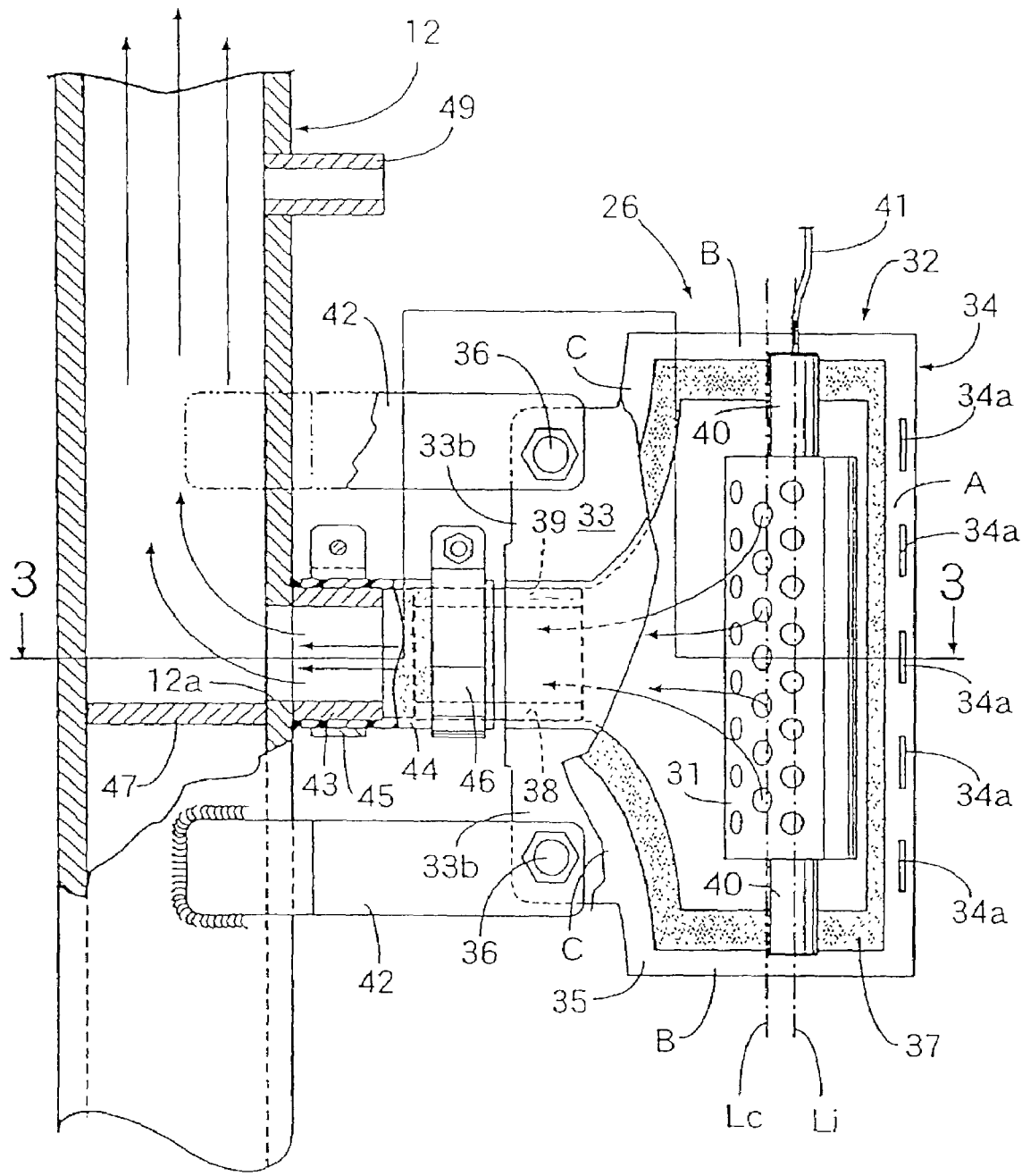
FIG. 2 is an enlarged cross section showing the portion designated by 2 in FIG. 1.
Figure 3:
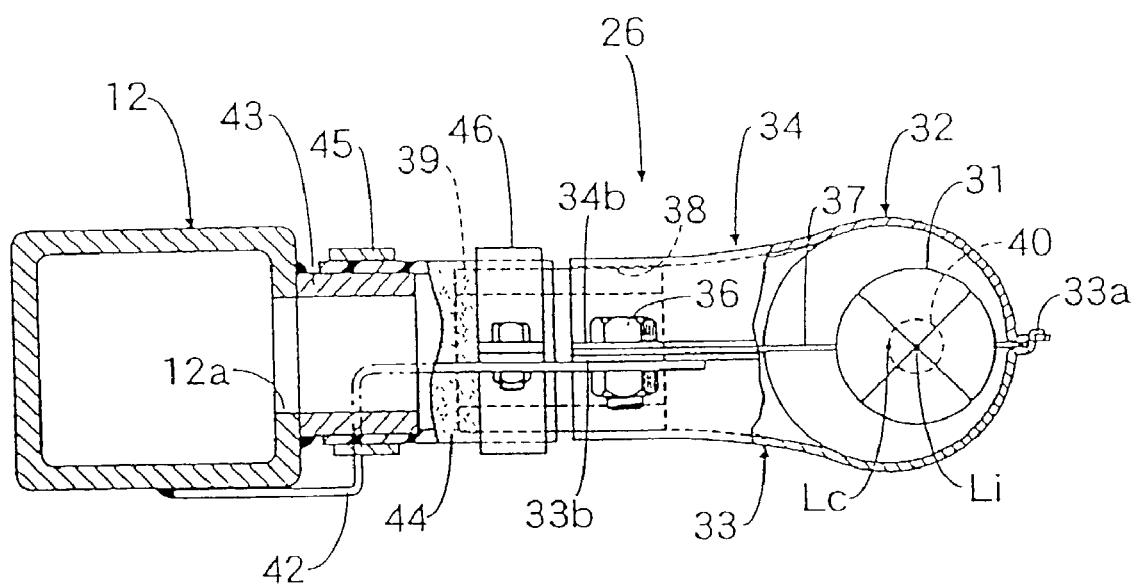
FIG. 3 is a cross-sectional view taken along the line 3—3 in FIG. 2.

As illustrated in FIGS. 2 and 3, the inflator unit 26 is provided with an inflator case 32 for storing the inflator 31. The inflator case 32 is a substantially cylindrical member closed at both ends thereof, and comprises a left case half 33 and right case half 34 formed by pressing metal plates and joined the plates integrally along the flat parting plane 35.

The parting plane 35 includes a first straight portion A extending in a direction of the axis Lc of the inflator case 32, a pair of second straight portions B, B extending in a direction orthogonal to the axis Lc of the inflator case 32 and continuing to both ends of the first straight portion A, and a pair of curved portions C, C continuing from the ends of the second straight portions B, B and extending in an arcuate shape to the direction away from the first straight portion A.

On the first straight portion A, a plurality of hooks 33a . . . (See FIG. 3) are formed on the left case half 33 for engaging a plurality of slits 34a . . . (See FIG. 2) formed on the right case half 34. These engaged portions serve as a hinge so that the left and right case halves 33, 34 can be opened and closed. Each of the left and right case halves 33, 34 are provided with two fastening portions 33b, 33b; 34b, 34b continuing to the pair of curved portions C, C of the parting plane 35 towards the outside, so that the fastening portions 33b, 33b of the left case half 33 and the fastening portions 34b, 34b of the right case half 34 are overlapped with each other and are fastened by two bolts 36, 36. In this case, placing a flat sealing member 37 along the parting plane 35 seals the internal space of the inflator case 32. In the vicinity of the pair of curved portions C, C of the parting plane 35, the internal space of the inflator case 32 narrows in the shape of a funnel towards the exit opening 38 that includes a circular cross section. The upstream end of the hose connecting pipe 39 is clamped and fixed at the exit opening 38.

The inflator 31, filled with propellant for generating gas when burned, is a cylindrical member, and is fixed by interposing the pair of supporting portions 40, 40 projecting from both ends thereof in the axial direction between the second straight portions B, B of the parting plane 35 of the inflator case 32. In such a case, drawing a harness 41 in communication with the inflator 31 out of the inflator case 32 through the interior of one of the supporting portions 40 eliminates the necessity of a specific grommet or the like for sealing the portion through which the harness 41 is drawn. Thus, the hermeticity of the inflator case 32 can be enhanced while reducing the number of components. The axis Li of the inflator 31 is shifted towards the side opposite from the exit opening 38 (that is, on the side of the first straight portion A of the parting plane 35) with respect to the axis Lc of the inflator case 32.

Two stays 42, 42 welded to the main frame 12 are fastened to the fastening portions 33b, 33b; 34b, 34b of the left and right casing halves 33, 34 together by means of two bolts 36, 36, whereby the inflator case 32 is fixed to the main frame 12. The connecting pipe 43 is welded on the main frame 12 and faces towards the hose connecting pipe 39 of the inflator case 32. Both ends of the gas supply hose 44 for connecting the connecting pipe 43 and the hose connecting pipe 39 are fixed by two fixing bands 45, 46.

The interior of the main frame 12 is square in cross section and communicates with the connecting pipe 43 via a through hole 12a. The interior of the main frame 12 is closed by the parting strip 47 at the lower end of the through hole 12a, and the front end portion of the main frame is adjacent to the head pipe 11 and is closed by the parting strip 48 (See FIG. 4). Provided on the main frame 12 at a position upwardly of the through hole 12a is an atmosphere communicating hole 49 for communicating the interior of the main frame 12 with the atmosphere.

Figure 4:
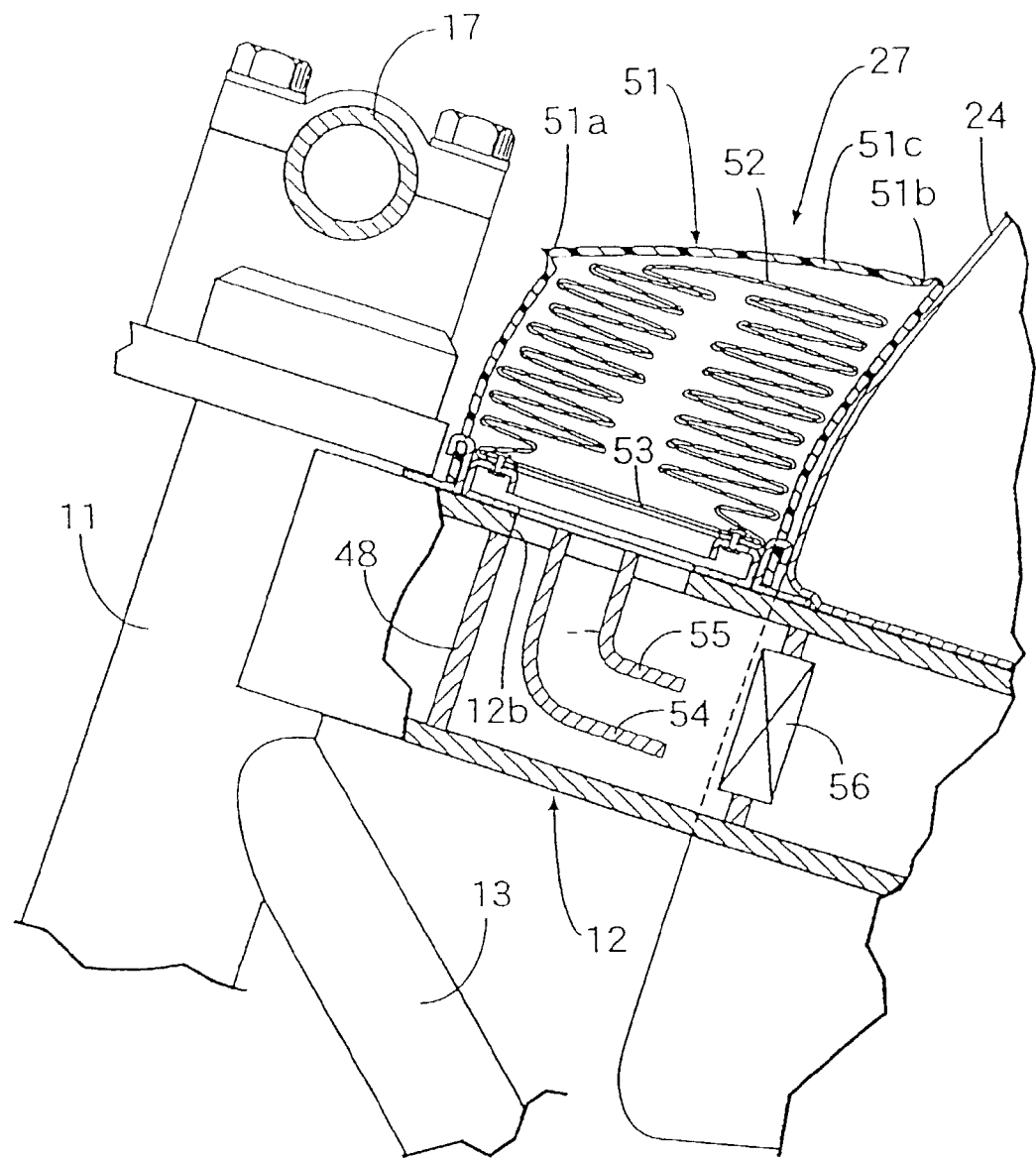
FIG. 4 is an enlarged cross-sectional view showing the portion designated by 4 in FIG. 1;.

As is clear from FIG. 4, the airbag unit 27 is disposed on the upper surface of the main frame 12 so as to be interposed between the head pipe 11 and the fuel tank 24. The airbag unit 27 includes an airbag case 51 formed of synthetic resin, an airbag 52 stored in a folded state in the airbag case 51 and a retainer 53 fixed so as to surround the through hole 12b formed on the main frame 12 for supporting the proximal end portion of the airbag 52. A hinge portion 51a is formed at the front edge of the airbag case 51 with thin breakable portions 51b formed along three sides continuing from the hinge portion 51a, so that a lid 51c is defined at the portion surrounded by the hinge portion 51a and the breakable portions 51b. Gas guiding plates 54, 55 are bent into an L-shape and are fixed within the main frame 12 at a position facing to the through hole 12b. Provided at a position facing towards the rear portions of the gas guiding plates 54, 55 is a one-way valve 56 for allowing gas to flow from the side of the inflator unit 26 towards the side of the airbag unit 27 and preventing gas from flowing from the side of the airbag unit 27 towards the side of the inflator unit 26.

Subsequently, the operation of the embodiment of the present invention having aforementioned construction will be described.

Figure 5:
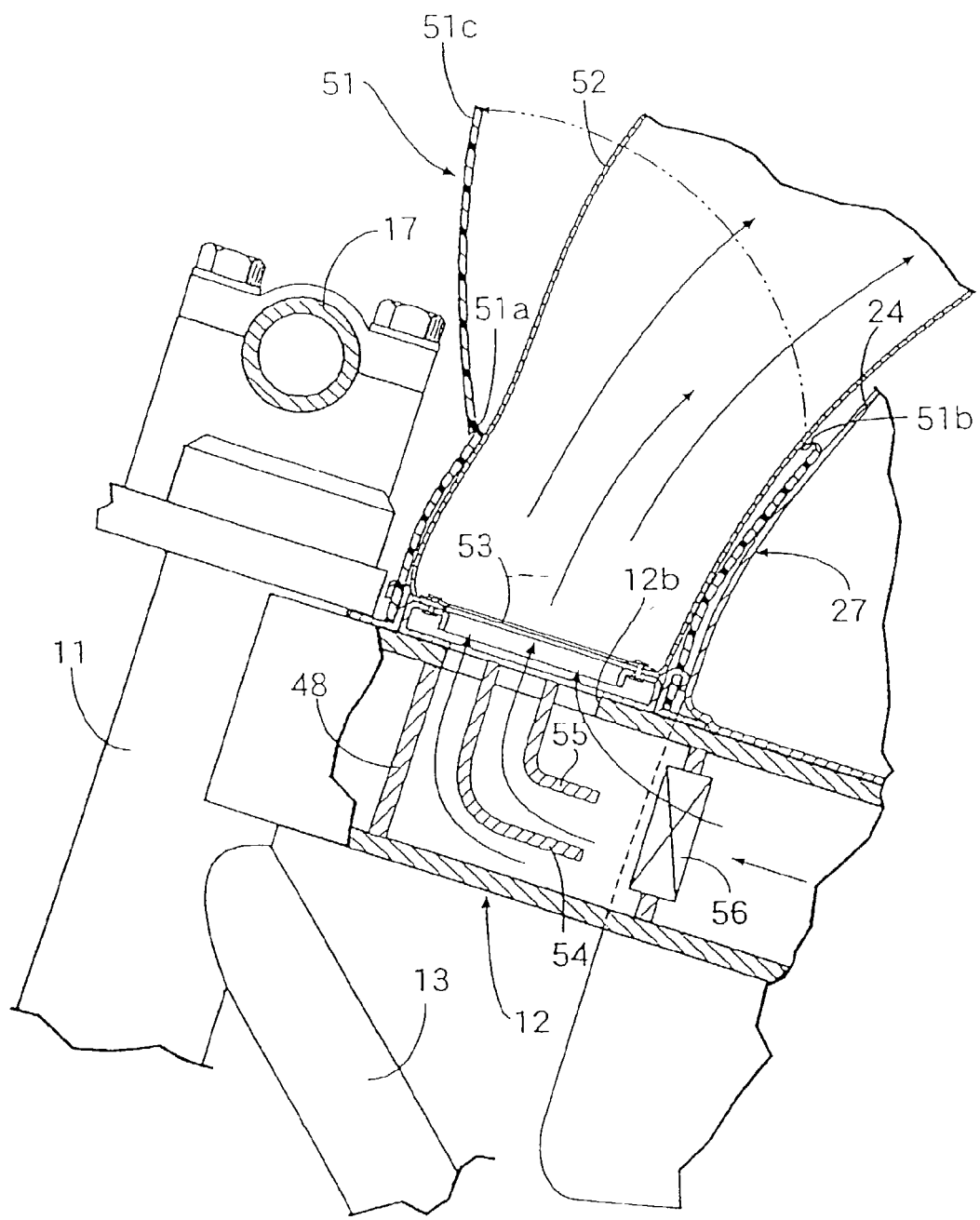
FIG. 5 is an explanatory drawing corresponding to FIG. 4 for illustrating the operation.

When the motorcycle V is involved with a collision and an acceleration in excess of a prescribed value is detected by the acceleration sensor, not shown, the inflator 31 stored in the inflator case 32 is ignited to generate gas. The gas is guided along the inner surface of the inflator case 32 in the funnel shape and flows through the hose connecting pipe 39 supported at the exit opening 38, the gas supply hose 44, the connecting pipe 43 and through hole 12a into the main frame 12. Gas flows in the main frame 12 towards the front passes through the one-way valve 56 and then is deflects upwardly to the rear along the gas guiding plates 54, 55 and flows through the through hole 12b into the interior of the airbag 52 stored in a folded state in the airbag case 51. When the airbag 52 is inflated by gas pressure, the breakable portions 51b of the airbag case 51 break as shown in FIG. 5, and the lid 51c is opened about the hinge portion 51a and the airbag 52 is deployed through the opening formed thereon obliquely upwardly towards the occupant.

In this way, since the internal space of the main frame 12 of the motorcycle V is used as a gas passage for supplying gas to the airbag unit 27 from the inflator unit 26, the number of components can be reduced in comparison with the case in which a specific gas passage is provided. In addition, this construction contributes to saving space and providing an improved appearance because the specific gas passage is not exposed.

Since the inflator case 32 for storing the inflator 31 is divided into the left case half 33 and the right case half 34 along the flat parting plane 35, storage and sealing of the inflator 31 can be easily and reliably achieved. In addition, since the pair of supporting portions 40 projecting from both ends of the inflator 31 are held and supported between the left case half 33 and the right case half 34, the inflator 31 can be easily supported and the number of steps for assembling the inflator unit 26 can be reduced. Since the inflator 31 is covered hermetically by the inflator case 32, the inflator 31 can be protected from an external force, water, dust, and the like. Thus, it is especially effective when applied to a motorcycle.

In addition, since the internal space of the inflator case 32 narrows towards the exit opening 38 in a funnel shape, gas generated by the inflator 31 can be introduced smoothly into the exit opening 38 without providing a specific straightening member such as a diffuser. Especially, since the axis Li of the inflator 31 is shifted towards the side opposite from the exit opening 38 with respect to the axis Lc of the inflator case 32, gas generated by the inflator 31 can be introduced further smoothly towards the exit opening 38.

When gas generated by the inflator 31 flows inside the main frame 12 at high velocities, air is introduced through the atmosphere communicating hole 49 due to the negative pressure generated in the main frame 12. This air that is introduced is supplied to the airbag 52 together with gas generated by the inflator 31. Accordingly, even when a compact inflator 31 having a small capacity is used, the airbag 52 can be deployed without fail by the cooperation of the gas generated by the inflator 31 together with air introduced through the atmosphere communicating hole 49. In addition, gas and air passed through the one-way valve 56 and flowing into the airbag 52 is blocked by the one-way valve 56 from flowing back to the main frame 12 side and thus the airbag 52 can be maintained in the deployed state even when the load of the occupant is exerted on the airbag 52. Thus, the capability of constraining occupant is enhanced.

Though the direction in which gas flows in the main frame 12 and the direction in which the airbag 52 is deployed is away from each other by approximately 90°, the provision of gas guiding plates 54, 55 at the position facing towards the through hole 12b of the main frame 12 enables gas flowing though the main frame 12 to be deflected smoothly towards the airbag 52, to deploy the airbag 52 in the desired direction without fail.

Though an embodiment of the present invention has been described thus far, various modifications in design may be made without departing from the scope of the invention.

For example, though the inflator unit 26 is provided on the main frame 12 in the embodiment, it may be provided at other arbitrary positions (for example, on the down tube 13). Though the airbag unit 27 is provided forwardly of the fuel tank 24, it may also be provided at other arbitrary positions (for example, at the recessed portion formed on the upper surface of the fuel tank 24).

As is described thus far, according to the present invention, since the inflator case for storing the inflator is disposed separately from the airbag unit for storing the folded airbag and is divided into a pair of case halves along the flat parting plane, the inflator is reliably stored in an inflator case which is simple in construction and can be easily manufactured. In addition, since the inflator case can be sealed easily and the inflator can be protected from a force, water, dust, and the like only by sealing the flat plane, it is especially effective for mounting on a motorcycle or the like.

According to the present invention, since the plurality of supporting portions projecting from the inflator body is held and supported along the parting plane between the pair of case halves of the inflator case, the inflator can be attached or detached only by separating the pair of case halves. Thus, a special fixing member for fixing the inflator is not necessary, thereby contributing to a reduction in the number of components and the number of assembling steps.

According to the present invention, since the harness extending from the inflator is drawn out of the inflator case through the interior of the supporting portion, it is not necessary to provide a specific hole for passing the harness thorough on the inflator case. In addition, the sealing of the inflator case is facilitated.

According to the present invention, since the gas supply member connecting unit continuing to the gas supply member is provided on the inflator case, gas generated by the inflator in the sealed inflator case can reliably be supplied to the gas supply member via the gas supply member connecting unit.

According to the present invention, since the interior of the inflator case is tapered towards the gas supply member connecting unit, gas generated by the inflator can be introduced smoothly into the gas supply member without providing a specific straightening member such as a diffuser.

Figure 6:
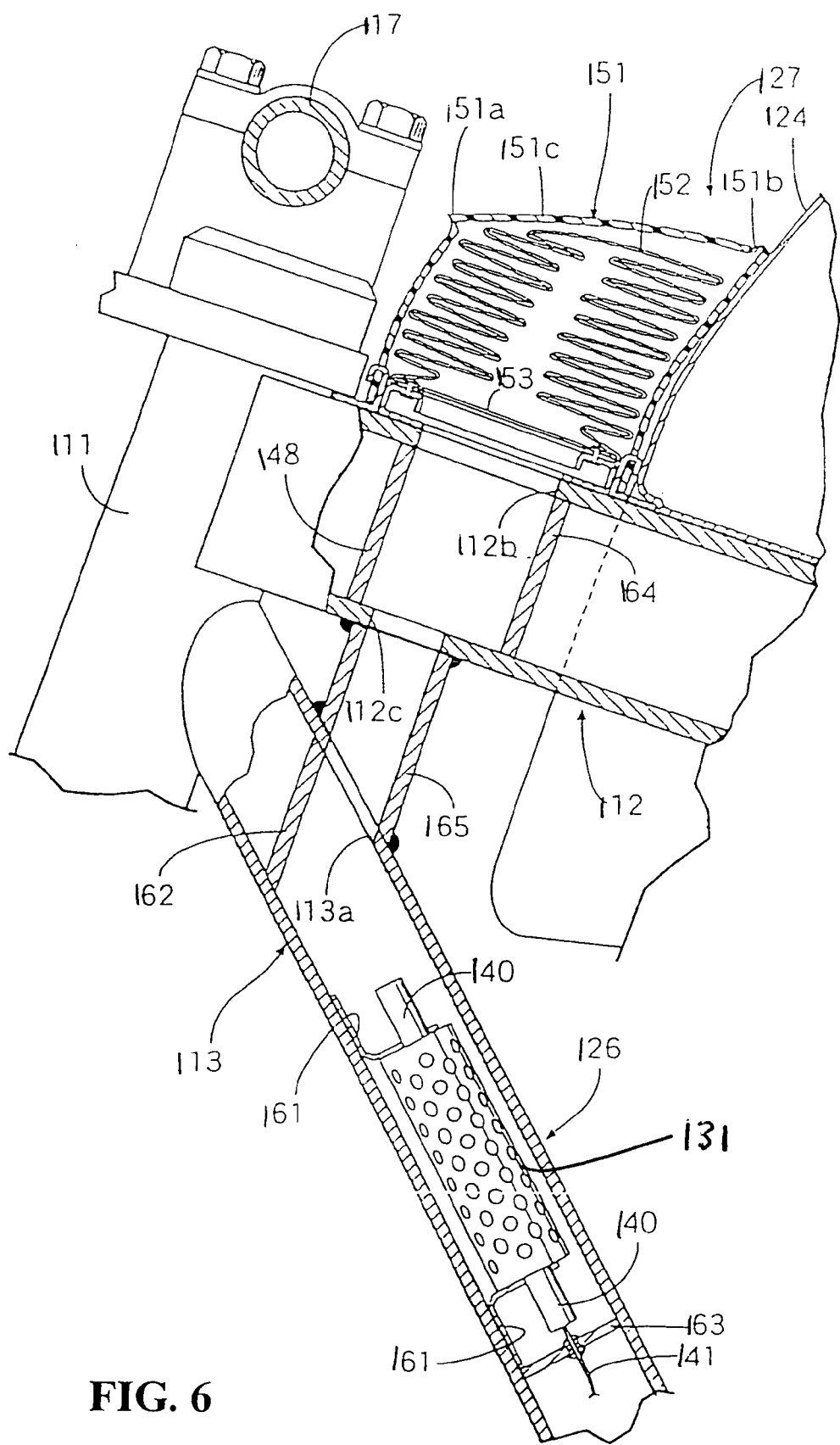
FIG. 6 is an explanatory drawing showing a second embodiment of the present invention.

Referring now to FIG. 6, a second embodiment of the present invention will be described. In the second embodiment, the inflator unit 126 is stored in the down tube 113, and the inflator is fixed to the mounting brackets 161, 161 at the supporting portions 140, 140 at both ends thereof. The down tube 113 is closed by the parting strips 162, 163 at the front and the rear of the inflator unit 126. The interior of the main frame 112 is closed by the parting strips 148, 164 with the through hole 112c of the main frame 112 and the through hole 113a of the down tube 113 being connected via a connecting pipe 165 for supplying gas generated by the inflator 131 through the interior of the down tube 113 to the air bag unit 127. Therefore, gas generated by the inflator 131 in the case of a collision of the motorcycle V is supplied through the down tube 113, the through hole 113a, the connecting pipe 165, the through hole 112c, the main frame 112, the through hole 112b to the airbag unit 127. A retainer unit 153 is fixed relative to the airbag 152 so as to surround the through hole 112b formed in the main frame 112.

Since gas is supplied from the inflator unit 126 to the airbag unit 127 using a part of the vehicle body frame F of the motorcycle V as a gas passage, this embodiment may also contribute to a reduction in the number of components as compared with the case where a specific gas passage is provided. In addition, a saving is provided with respect to the space and to an improvement in the appearance because a specific gas passage is not exposed. Since the inflator unit 126 is stored in the down tube 113, additional space may further be saved in comparison with the case where it is disposed outside.

Though an embodiment of the present invention has been described thus far, various modifications in design may be made without departing from the scope of the invention.

For example, though the airbag unit 127 is disposed forwardly of the fuel tank 124 in the embodiment, it may be provided on other arbitrary positions (for example, on the recessed portion formed on the upper surface of the fuel tank 124).

Alternatively, the inflator unit 126 can be stored in the main frame 112 instead of storing in the down tube 113.

As is described thus far, according to the present invention, since the interior of the pipe member constituting a part of the vehicle body frame is used as a gas passage for introducing gas generated by the inflator into the airbag unit, a specific hose for connecting the inflator and the airbag unit is not necessary, whereby the number of components is reduced, the space required is reduced, and the appearance is improved.

According to the present invention, since the inflator is stored in the pipe member that constitutes a part of the vehicle body frame, the space for installing the inflator may be saved and the appearance may be improved.

According to the present invention, since the one-way valve is provided in the pipe member, gas supplied from the inflator through the interior of the pipe member to the airbag unit is prevented from flowing back to the inflator side due to a load exerted to the deployed airbag. Thus, a sufficient shock absorbing effect can be exercised with a small-capacity inflator.

According to the present invention, since the inflator is disposed eccentrically in the inflator storage section, and the exit opening for allowing gas to exit from the inflator storage section towards the pipe member is disposed at the position far from the inflator, gas generated by the inflator can be supplied smoothly from the exit opening to the pipe member.

According to the present invention, since the atmosphere communication hole in communication with the atmosphere is provided in the pipe member, the atmosphere may be introduced into the pipe member through the atmosphere communication port by the negative pressure generated when gas flows from the inflator to the airbag unit. Thus, a large-volume airbag can be deployed with a small-capacity inflator.

According to the present invention, since the gas guiding plate is provided at the connecting portion between the airbag case of the airbag unit and the pipe member, the airbag can be deployed in the desired direction irrespective of the mounting direction of the airbag case by deflecting the direction of gas flowing into the airbag case by means of the gas guiding plate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An airbag system comprising:
   an airbag unit for storing a folded airbag;
   an inflator unit for storing an inflator for generating gas for inflating the airbag;
   the airbag unit and the inflator unit being connected to each other via a gas supply member; and
   an inflator case for storing and protecting the inflator hermetically, said inflator case being divided into a pair of two case halves along a flat parting plane,
   the gas supply member being an interior portion of a main frame member of a vehicle, the main frame member extending rearwardly from a head pipe,
   wherein the inflator case is disposed in a space surrounded by the main frame member, a seat rail and a lower pipe of the vehicle and connected to a rearward portion of the main frame member, and the airbag unit is disposed on and connected to an upper surface of the main frame member in the vicinity of the head pipe,
   wherein an interior portion of the main frame member is used as a gas passage for introducing gas generated by the inflator into the airbag unit, and
   wherein an L-shaped gas guiding plate is provided in the main frame member near the airbag to deflect gas flow to the airbag.

2. The airbag system according to claim 1, wherein a plurality of supporting portions projecting from the inflator are held and supported between a pair of case halves of the inflator case along the parting plane.

3. The airbag system according to claim 2, wherein a harness extending from the inflator is drawn out of the inflator case through the interior of any one of a plurality of supporting portions.

4. The airbag system according to claim 2, wherein the inflator case is provided with a gas supply member connecting unit disposed between the inflator unit and the gas supply member for supplying the gas to the airbag unit.

5. The airbag system according to claim 4, wherein the interior of the inflator case is tapered towards the gas supply member connecting unit.

6. The airbag system according to claim 1, wherein a harness extending from the inflator is drawn out of the inflator case through the interior of any one of a plurality of supporting portions.

7. The airbag system according to claim 6, wherein the inflator case is provided with a gas supply member connecting unit disposed between the inflator unit and the gas supply member for supplying the gas to the airbag unit.

8. The airbag system according to claim 7, wherein the interior of the inflator case is tapered towards the gas supply member connecting unit.

9. The airbag system according to claim 1, wherein the inflator case is provided with a gas supply member connecting unit disposed between the inflator unit and the gas supply member for supplying the gas to the airbag unit.

10. The airbag system according to claim 9, wherein the interior of the inflator case is tapered towards the gas supply member connecting unit.

11. The airbag system according to claim 1, wherein the inflator case is hermetically sealed.

12. An airbag system comprising:
    an airbag unit for storing a folded airbag;
    an inflator for generating gas for inflating the airbag; and
    the airbag unit and the inflator being disposed separately;
    wherein an interior portion of a pipe member constituting a part of a vehicle body frame (F) is used as a gas passage for introducing gas generated by the inflator into the airbag unit,
    wherein the inflator is disposed in an inflator storage section eccentrically and an exit opening for allowing gas to exit from the inflator storage section towards the pipe member is provided on a side far from the inflator.

13. The airbag system according to claim 12, wherein a one-way valve for allowing gas to flow only in the direction from the inflator towards the airbag unit is provided in the pipe member.

14. The airbag system according to claim 13, wherein an atmosphere communication hole in communication with the atmosphere is provided on the pipe member.

15. The airbag system according to claim 13, and further including gas guiding plates for limiting the direction of flow of gas into an airbag case, said gas guiding plates being provided at a connecting portion between the airbag case of the airbag unit and the pipe member.

16. The airbag system according to claim 12, wherein an atmosphere communication hole in communication with the atmosphere is provided on the pipe member.

17. The airbag system according to claim 16, and further including gas guiding plates for limiting the direction of flow of gas into an airbag case, said gas guiding plates being provided at a connecting portion between the airbag case of the airbag unit and the pipe member.

18. The airbag system according to claim 12, and further including gas guiding plates for limiting the direction of flow of gas into an airbag case, said gas guiding plates being provided at a connecting portion between the airbag case of the airbag unit and the pipe member.

19. The airbag system according to claim 12, wherein the inflator case is hermetically sealed.

20. An airbag system comprising:
    an airbag unit for storing a folded airbag;
    an inflator for generating gas for inflating the airbag; and
    the airbag unit and the inflator being disposed separately;
    wherein an interior portion of a main frame member constituting a part of a vehicle body frame (F) is used as a gas passage for introducing gas generated by the inflator into the airbag unit, and wherein at least one L-shaped gas guiding plate is disposed inside the main frame member for deflecting the gas into the airbag, the gas guiding plate facing a through hole formed on the main frame member for supporting the airbag such that the gas flow is introduced through the through hole to the interior of the airbag.

21. The airbag system according to claim 20, wherein a front end portion of the main frame member adjacent to a head pipe is closed by a parting strip.

* * * * *